United States Patent [19]

Bauman et al.

[11] 4,348,297

[45] Sep. 7, 1982

[54] CRYSTALLINE LITHIUM ALUMINATES

[75] Inventors: William C. Bauman; John M. Lee, both of Lake Jackson, Tex.

[73] Assignee: The Dow Chemical Company, Midland, Mich.

[21] Appl. No.: 217,612

[22] Filed: Dec. 18, 1980

Related U.S. Application Data

[60] Continuation-in-part of Ser. No. 95,692, Nov. 19, 1979, which is a division of Ser. No. 939,545, Sep. 5, 1978, Pat. No. 4,221,767, which is a division of Ser. No. 812,534, Jul. 5, 1977, Pat. No. 4,116,856.

[51] Int. Cl.³ .................... B01D 15/04; C01D 15/00
[52] U.S. Cl. .................................. 252/184; 55/67; 55/386; 210/663; 423/179.5; 423/181; 521/28
[58] Field of Search ............... 252/184; 55/67, 386; 210/198.2, 663; 423/179.5, 181; 521/28

[56] References Cited

U.S. PATENT DOCUMENTS

| | | | |
|---|---|---|---|
| 4,116,856 | 9/1978 | Lee et al. | 252/184 |
| 4,116,857 | 9/1978 | Lee et al. | 252/184 |
| 4,116,858 | 9/1978 | Lee et al. | 252/184 |
| 4,159,311 | 6/1979 | Lee et al. | 423/181 |
| 4,221,767 | 9/1980 | Lee et al. | 423/179.5 |
| 4,284,727 | 8/1981 | Boros et al. | 521/28 |

*Primary Examiner*—Irwin Gluck
*Attorney, Agent, or Firm*—W. J. Lee

[57] ABSTRACT

Crystalline $LiOH.2Al(OH)_3.nH_2O$ is reacted in aqueous solution with anions (A) having a valence of 1, 2, or 3 to form novel lithium aluminates conforming substantially to the empirical formula $$(LiA_x)_y.2Al(OH)_3.nH_2O$$

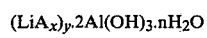

where n is the number of waters of hydration, y is the number of lithium atoms present for each 2Al atoms, A has a negative valence of 1, 2, or 3, and x is the reciprocal of the valence of A.

12 Claims, No Drawings

CRYSTALLINE LITHIUM ALUMINATES

CROSS-REFERENCE TO RELATED APPLICATIONS

This is a continuation-in-part of our copending application Ser. No. 95,692 filed Nov. 19, 1979 which is a divisional of Ser. No. 939,545 filed Sept. 5, 1978, now U.S. Pat. No. 4,221,767, which is in turn, a divisional based on Ser. No. 812,534 filed July 5, 1977, now U.S. Pat. No. 4,116,856.

BACKGROUND OF THE INVENTION

Our copending application referred to above teaches and claims composites of ion exchange resins having suspended therein a crystalline hydrous alumina, an amorphous hydrous alumina, or a crystalline LiOH.2Al(OH)$_3$ structure. From these aluminas and aluminates, crystalline lithium haloaluminates are beneficially prepared.

The present invention relates to preparations of numerous lithium aluminates from crystalline LiOH.2Al(OH)$_3$, whether or not the aluminate is suspended in (or on) a substrate.

SUMMARY OF THE INVENTION

A crystalline lithium aluminate conforming substantially to the empirical formula LiOH.2Al(OH)$_3$.nH$_2$O is reacted with compounds in aqueous solution which contain anionic moieties of a valence of 1, 2, or 3, thereby substituting said anionic moieites into the lithium aluminate structure in place of the OH$^-$ ion of the LiOH, thus forming new crystalline lithium aluminates conforming substantially to the empirical formula:

$(LiA_x)_y.2Al(OH)_3.nH_2O$ where A is the anionic moiety of a valence of 1, 2, or 3; x is the reciprocal of the valence of A; y is the number of lithium atoms present for each 2Al atoms; and n is the number of waters of hydration present for each 2Al atoms.

DETAILED DESCRIPTION OF THE INVENTION

As shown in our copending application Ser. No. 95,692 filed Nov. 20, 1979, which application is incorporated herein by reference, hydrous alumina, represented by the formula Al(OH)$_3$, is suspended in an ion exchange resin and is reacted with aq. LiOH at elevated temperature to form crystalline LiOH.2Al(OH)$_3$. It is understood, of course, that the so-formed crystalline aluminates, being in contact with water, have waters of hydration attached.

The said copending application also discloses that the crystalline LiOH.2Al(OH)$_3$ is beneficially converted to LiX.2Al(OH)$_3$, where X is a halogen, i.e. Cl, Br, or I.

We have also found that the crystalline LiOH.2Al(OH)$_3$, whether supported within or on a substrate, or prepared in the absence of a substrate, is beneficially converted to other lithium aluminates by reactions which replace the OH radicals with other anions or radicals having a valence of 1, 2, or 3.

Substrates in addition to ion exchange resins contemplated in accordance with the present invention include, e.g., inorganic substrates (which are substantially inert to the reactions involved in preparing the $(LiA_x)_y.2Al(OH)_3.nH_2O$), inert organic or inert polymeric substrates, and inert metallic substrates.

The "neat" preparations of the subject compounds, i.e. in the absence of a substrate, are also contemplated according to the present invention and usually allow larger aggregates or stacks of the crystals in the crystalline structure.

The anions (A) (other than halide and hydroxyl) which are contemplated within the purview of the present invention are the anions of soluble inorganic acids, mineral acids, organic acids having, preferably, up to about 8 carbon atoms, or anions of the water-soluble salts of such acids. The anions may have valences of 1, 2, or 3. Generally speaking, anions which are larger than those containing about 8 carbon atoms are relatively bulky and may require extra effort to create intercalation compounds in the aluminate crystal structure.

The anions of inorganic acids and mineral acids are, for example, $SO_4^{--}$, $HCO_3^-$, $BO_2^-$, $H_2PO_4^-$, $HPO_4^{--}$, $ClO_4^-$, $HCrO_4^-$, $NO_3^-$, $SO_3^{--}$, $HSO_3^-$, $NO_2^-$, $H_2AsO_4^-$, $HAsO_4^{--}$, $F^-$, $HS^-$, $ClO_3^-$, $H_2PO_3^-$, $HPO_3^{--}$, $H_3P_2O_7^-$, $H_2P_2O_7^{--}$, $HP_2O_7^{---}$, $NH_2SO_3^-$, and the like.

The anions of organic acids may be derived, for example, from monobasic acids (RCOOH), dibasic acids (HOOC—COOH or HOOC—R—COOH), and tribasic acids (HOOC—R(COOH)—COOH) where R is a substituted or unsubstituted hydrocarbon moiety. Examples of monobasic acids are, for instance, formic acid, acetic acid, chloroacetic acid, dichloroacetic acid, trichloroacetic acid, acrylic acid, methacrylic acid, crotonic acid, butyric acid, propionic acid, tartaric acid, hexanoic acid, and the like. Examples of dibasic acids are, for instance, oxalic acid, malonic acid, malic acid, succinic acid, pimelic acid, and the like. Citric acid is an example of a tribasic acid, HOOCCH$_2$C(OH)(COOH)CH$_2$COOH. Hydroxy carboxylic acids, such as glycollic acid, lactic acid, tartaric acid, and malic acid are within the purview of the present invention. Organic radicals with inorganic substituents, such as CH$_3$SO$_3^-$, and C$_6$H$_{11}$SO$_3^-$ are within the purview of this invention.

The Process in General

Crystalline or amorphous hydrous alumina, denoted as Al(OH)$_3$, is reacted at elevated temperature to form crystalline LiOH.2Al(OH)$_3$.nH$_2$O in an aqueous medium. The beginning hydrous alumina may be unsupported by a substrate, or may be supported on a substrate, or may be dispersed or suspended within a porous substrate. The reaction between the hydrous alumina and the LiOH may take place at room temperature but to assure that the reaction is substantially completed within a reasonable length of time, an elevated temperature of at least 50° C., preferably at least about 75° C. should be used. The amount of LiOH should not be in such excess that the aluminate is caused to precipitate outside the pores. The aqueous media may contain other ingredients and, if they are substantially inert or do not interfere with the desired reaction, are permissible. Insoluble, substantially inert particles may be present in the aqueous medium and may serve as a substrate for the LiOH.2Al(OH)$_3$ as it is formed. Choice of a substrate (if used) is dependent, of course, on the intended use of, or application of, the crystalline LiOH.2Al(OH)$_3$.nH$_2$O.

The present invention is not limited to a particular means for providing the beginning hydrous alumina for reaction with the LiOH. For example, the pores of a substrate may be substantially filled with $Al(OH)_3$ by growing seeds of $Al(OH)_3$ in the pores from an aqueous solution of sodium aluminate.

The crystalline $LiOH \cdot 2Al(OH)_3 \cdot nH_2O$ is then reacted in aqueous medium with anions or negative-valence radicals (A) having a valence of 1, 2, or 3 to form the $(LiA_x)_y \cdot 2Al(OH)_3 \cdot nH_2O$ compounds of the present invention. A monovalent anion or radical yields $(LiA)_y \cdot 2Al(OH)_3 \cdot nH_2O$. A divalent anion or radical yields $(LiA_{\frac{1}{2}})_y \cdot 2Al(OH)_3 \cdot nH_2O$. A trivalent anion or radical yields $(LiA_{\frac{1}{3}})_y \cdot 2Al(OH)_3 \cdot nH_2O$. The value of y is normally 1, but the actual value of y may vary over the range of about 0.5 to 1.2.

The so-prepared lithium aluminates are useful in selectively recovering $Li^+$ ions from solution if the amount of $LiA_x$ in the aluminate structure is first reduced to a lower concentration (but not completely removed), leaving space in the crystal for taking up $LiA_x$ salt until the crystal is once again "loaded" with $LiA_x$ salt.

The so-prepared lithium aluminates are also useful in exchanging of anions in aqueous solution, where an anion in solution replaces the anion in the crystal. For instance, where the A anion is the ascorbate radical of ascorbic acid (Vitamin C), the ascorbate anion is replaced by Cl in aqueous HCl, thereby providing ascorbic acid in the aqueous medium. The anion of ascorbic acid (a lactone) is formed by a keto-to-enol shift.

It is well known that catalytic systems based on zeolite crystals are quite sensitive to inter crystalline spacing. The novel lithium aluminates of the present invention provide an array of acid catalysts wherein the interplane or spacing of the crystalline aluminate structure is varied according to the size of the salt anion in the lithium aluminate.

The following examples are given to illustrate the practice of the present invention, but the invention is not limited to the particular embodiments illustrated.

EXAMPLES

An aqueous solution of $AlCl_3$ is reacted with $NH_4OH$ thereby precipitating $Al(OH)_3$. The $Al(OH)_3$ is washed with $H_2O$ to wash out $NH_4Cl$ and a slurry of the $Al(OH)_3$ in water is reacted with LiOH at elevated temperature (about 95° C.) to form crystalline $LiOH \cdot 2Al(OH)_3 \cdot nH_2O$.

A portion of the $LiOH \cdot 2Al(OH)_3 \cdot nH_2O$ slurried in water is titrated to pH 6 with $CCl_3COOH$ to form crystalline $Li(CCl_3COO) \cdot 2Al(OH)_3 \cdot nH_2O$.

In a similar manner other lithium aluminates are prepared wherein the anion is $BO_2^-$, $NO_3^-$, $HCO_3^-$, $H_2PO_4^-$, $SO_4^{--}$, $F^-$, $CH_2ClCOO^-$, $CCl_2HCOO^-$.

X-ray diffraction patterns on the above products indicate a crystalline material falling into the trigonal system with hexagonal axial lengths of between 21-42 Å for $C_o$ with A and B axis of 5.06-5.14 Å, with the dimensions being dependent on the size of the anion. White powders are generally produced, but tinted or colored products are not precluded from this invention.

The number of waters of hydration in the crystalline aluminates of the present invention is generally within the range of about 1 to about 6, though the number of waters is substantially reduced to one by heating the aluminates at a temperature in the range of about 100° C. to about 120° C. Heating at excessive temperatures tends to decompose the crystals.

We claim:

1. Crystalline lithium aluminates conforming substantially to the empirical formula $$(LiA_x)_y \cdot 2Al(OH)_3 \cdot nH_2O$$

where
   A represents anions or negative-valence radicals, other than hydroxyl, having a valence of 1, 2, or 3,
   x is the reciprocal of the valence of A,
   y is a numerical value in the range of about 0.5 to about 1.2, and
   n is a value of at least about 1 for waters of hydration.

2. A method for preparing crystalline lithium aluminates conforming substantially to the empirical formula $$(LiA_x)_y \cdot 2Al(OH)_3 \cdot nH_2O$$

wherein
   A represents anions or negative-valence radicals having a valence of 1, 2, or 3,
   x is the reciprocal of the valence of A,
   y is a numerical value in the range of about 0.5 to about 1.2, and
   n is a value of at least about 1 for waters of hydration,
   said process comprising reacting crystalline $LiOH \cdot 2Al(OH)_3 \cdot nH_2O$ with anions or negative-valence radicals contained in an aqueous medium, thereby replacing the $OH^-$ ions of the crystal with anions or negative-valence from said aqueous medium.

3. The crystalline lithium aluminates of claim 1 or 2 when prepared on or within a substantially inert support or substrate.

4. The crystalline lithium aluminates of claim 1 or 2 wherein A represents at least one anion or negative-valence radical of an inorganic acid, a mineral acid, an organic acid having from 1 to about 8 carbon atoms or of a salt of any of the said acids.

5. The crystalline lithium aluminates of claim 1 or 2 when dispersed or suspended in an ion exchange resin.

6. The crystalline lithium aluminates of claim 1 or 2 when supported by a substrate comprising substantially inert, solid bodies of inorganic, organic, polymeric, or metallic material.

7. The crystalline lithium aluminates of claim 1 or 2 when in an unsupported form.

8. The crystalline lithium aluminates of claim 1 or 2 when dried to the extent that there remains virtually one water of hydration.

9. The crystalline lithium aluminates of claim 1 or 2 wherein the waters of hydration are represented by a value of n in the range of about 1 to about 6.

10. Crystalline lithium aluminates conforming substantially to the empirical formula $$LiX \cdot 2Al(OH)_3 \cdot nH_2O$$

where
   X is at least one anion of the group comprising hydroxide, chloride, bromide, or iodide, and n represents the number of waters of hydration.

11. The crystalline lithium aluminates of claim 10 when supported on a solid, inert substrate or within a solid, inert substrate, wherein the said substrate is not an anion exchange resin.

12. The crystalline lithium aluminates of claim 10 or 11 when sufficiently dried to reduce the numerical value of n to one.

* * * * *

UNITED STATES PATENT AND TRADEMARK OFFICE
CERTIFICATE OF CORRECTION

PATENT NO. : 4,348,297
DATED : September 7, 1982
INVENTOR(S) : William Carrel Bauman, et al It is certified that error appears in the above—identified patent and that said Letters Patent is hereby corrected as shown below:

In the Abstract, line 1, change "$LiOH \cdot 2Al(OH_3 \cdot nH_2O$" to --$LiOH \cdot 2Al(OH)_3 \cdot nH_2O$--.

Col. 1, line 32, change "moieites" to --moieties--.

Signed and Sealed this

Fourth Day of January 1983

[SEAL]

Attest:

GERALD J. MOSSINGHOFF

Attesting Officer

Commissioner of Patents and Trademarks